US007711771B2

(12) United States Patent
Kirnos

(10) Patent No.: US 7,711,771 B2
(45) Date of Patent: May 4, 2010

(54) MANAGEMENT AND SYNCHRONIZATION APPLICATION FOR NETWORK FILE SYSTEM

(75) Inventor: Ilya Kirnos, Palo Alto, CA (US)

(73) Assignee: Oracle International Corporation, Redwood Shores, CA (US)

(*) Notice: Subject to any disclaimer, the term of this patent is extended or adjusted under 35 U.S.C. 154(b) by 1498 days.

(21) Appl. No.: 09/866,143

(22) Filed: May 25, 2001

(65) Prior Publication Data

US 2002/0188667 A1 Dec. 12, 2002

(51) Int. Cl.
G06F 15/16 (2006.01)
(52) U.S. Cl. .................. 709/203; 709/202; 707/101; 707/200; 707/218
(58) Field of Classification Search ............... 709/203, 709/202; 707/101, 200, 218, 204
See application file for complete search history.

(56) References Cited

U.S. PATENT DOCUMENTS

| 5,903,725 | A | | 5/1999 | Colyer | |
|---|---|---|---|---|---|
| 6,101,508 | A | * | 8/2000 | Wolff | 709/223 |
| 6,298,386 | B1 | * | 10/2001 | Vahalia et al. | 709/234 |
| 6,374,266 | B1 | * | 4/2002 | Shnelvar | 707/204 |
| 6,473,767 | B1 | * | 10/2002 | Bailey et al. | 707/102 |
| 6,636,878 | B1 | * | 10/2003 | Rudoff | 707/204 |
| 6,647,400 | B1 | * | 11/2003 | Moran | 707/205 |
| 6,856,993 | B1 | * | 2/2005 | Verma et al. | 707/101 |

FOREIGN PATENT DOCUMENTS

| EP | 0707263 A1 | 4/1996 |
|---|---|---|
| JP | 09-265424 | 10/1997 |
| JP | 09-330262 | 12/1997 |

OTHER PUBLICATIONS

International Search Report (PCT/US02/16481).
"Object Replacement using Dynamic Proxy Updates", Sathis Menon, et al., *Proceedings of the International Workshop on Configurable Distributed Systems*, IEEE, Los Alamos, CA 1994, pp. 82-91.
Current Claims from PCT/US02/16481, p. 1-17.
IPER from PCT/US02/16481, International Preliminary Examining Authority, Notification of Transmittal of the International Preliminary Examination Report, Jul. 11, 2003, pp. 1-8.
Current Claims from European Patent Application 02 744 174.0, pp. 1-11.
Communication Pursuant to Article 96(2) EPC, European Patent Application 02 744 174.0, European Patent Office, Apr. 4, 2004, pp. 1-4.
Europen Patent Office, "Communications Pursuant to Article 96(2) EPC," App. No. 02 744 174.0, dated Jan. 10, 2006, 4 pages.
Current Claims, EP App. No. 02 744 174.0, 12 pages.
Japanese Patent Office, "Notice of Grounds of Rejection", patent application No. 500739/2003, mailed May 20, 2008, 4 pages.
Claims, patent application No. 500739/2003, 7 pages.

* cited by examiner

*Primary Examiner*—Tonia L Dollinger
*Assistant Examiner*—Kyung H Shin
(74) *Attorney, Agent, or Firm*—Hickman Palermo Truong & Becker LLP

(57) ABSTRACT

An application is provided for managing files. Information about a file system is mapped to a comparison file. A working version is made from the file system. The application identify one or more operations were performed on the working version. The identified operations are recreated on the file system during a synchronization operation.

64 Claims, 11 Drawing Sheets

| Computer A | | Computer B | |
|---|---|---|---|
| File Name | Action Required | File Name | Action Required |
| $A_1$ | $_xM_y$ | $B_1$ | $_AC_B$ |
| $A_2$ | E | $B_2$ | E |
| ⋮ | ⋮ | ⋮ | ⋮ |
| $A_n$ | $(N)_xC_y$ | $B_n$ | D |

USER INTERFACE

FIGURE 10

MANAGEMENT AND SYNCHRONIZATION APPLICATION FOR NETWORK FILE SYSTEM

FIELD OF THE INVENTION

The present invention relates to an application for managing network files. In particular, embodiments of the invention pertain to detecting alterations to file systems for purpose of synchronization.

BACKGROUND OF THE INVENTION

When multiple file systems contain exactly the same content, the file systems are said to be "in sync". To keep file systems in sync, synchronization applications detect differences between file systems, and then perform operations to eliminate the differences. Typically, synchronization applications are used to synchronize the file systems of different computers that need to access different copies of the same files. A set of file systems that are to be synchronized with each other are referred to herein as a "synchronization set". Each file system that belongs to a given synchronization set is referred to as a "synchronized system".

The act of synchronizing a synchronization set is referred to as a synchronization operation. During each synchronization operation, a synchronization application typically attempts to detect when items have been deleted or added in any of the synchronized systems since the previous synchronization operation.

In general, synchronization applications seek to add to all synchronized systems those items that are detected as being added to any synchronized system since the previous synchronization operation. Similarly, synchronization applications seek to delete from all synchronized systems those items that are detected as being deleted from any synchronized system since the previous synchronization operation.

Typically, the synchronization application will not distinguish between (1) added items that are copies of other items and (2) added items that were created as originals. In addition, when a renamed item has been altered, it appears that the original item was deleted and a new item was added. Consequently, the original items may be deleted in all synchronized systems, and the new altered item will be added to all synchronized systems. Alternatively, the synchronization application may place both the altered item and the non-altered item together in the same file.

Under current synchronization techniques, if a user performs multiple operations on an item and then seeks to synchronize that item with another, the application will detect that item as altered or new. The application will not be able to detect specific operations performed on the item. As a result, the synchronization operation may delete one file for another, or add the altered file to be stored with the original file in the same file system.

Synchronization operations often involve a significant amount of resource consumption. For example, when a synchronization application detects the addition of a new file to one synchronized system, data transfer of the contents of the new file to all other synchronized systems is required. If the file is large and/or the number of synchronized systems is large, the resource consumption may be significant.

Another problem with current synchronization techniques is that new or replaced files do not retain metadata information from prior to their transfer or recreation on the file system. Thus, if a file created at time T1 is altered, the fact that the file was originally created at time T1 will be lost by when the synchronization application treats the altered file as a new file, and the original file as a deleted file.

SUMMARY OF THE INVENTION

Embodiments of the invention provide an application that can detect one or more operations performed on a first file system that is to be synchronized. The synchronization application updates a second file system using the detected operations of the first file system.

An embodiment of the invention is capable of detecting operations in the first file system, including copying an item, moving an item, creating a new item, deleting an item, and editing an item. An embodiment of the invention also detects multiple operations performed on the first file system. The detected operations may be recreated on the second file system during a synchronization operation.

Synchronization techniques described with embodiments of the invention incur less overhead than other synchronization processes in use. Furthermore, embodiments of the invention provide for synchronization techniques that preserve metadata information about synchronized files, in contrast to other synchronization processes that incur loss of such information.

BRIEF DESCRIPTION OF THE DRAWINGS

The present invention is illustrated by way of example, and not by way of limitation, in the figures of the accompanying drawings and in which like reference numerals refer to similar elements.

FIG. 10 illustrates a user-interface for use with an embodiment of the invention.

DETAILED DESCRIPTION OF THE INVENTION

Figure 1:
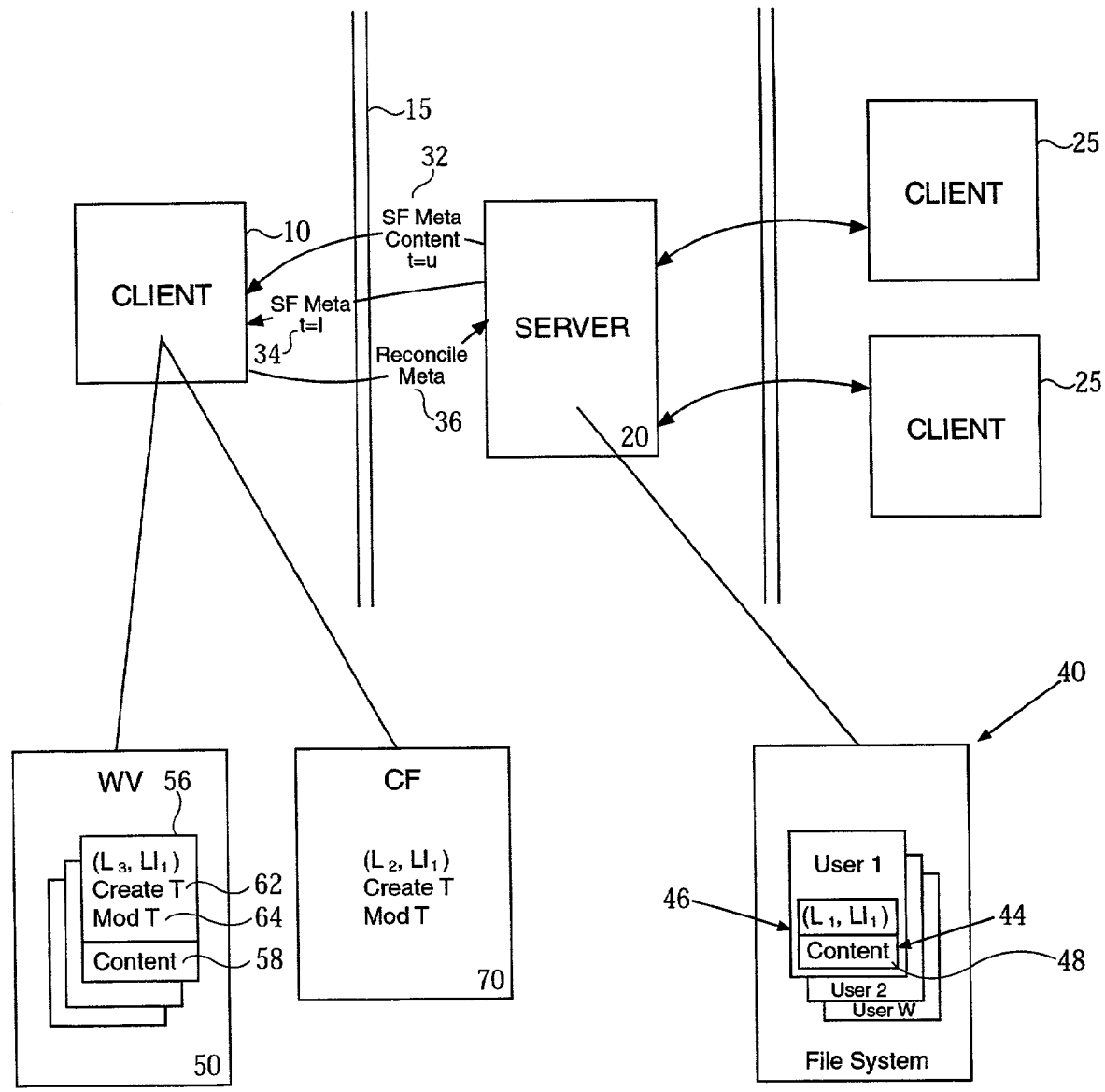
FIG. 1 is an overview of a system architecture, under an embodiment of the invention.

A method and apparatus for managing files is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Among advantages provided, embodiments of the invention enable a synchronization operation to be performed that identifies specific acts performed to file items that belong to synchronized systems. The specific operations are recreated on corresponding file items of other synchronized systems during the synchronization operation. As a result, complete transfers of file items may be avoided in many instances where such file items were merely altered or moved in some way. The result is that communication resources are conserved. In addition, corresponding file items of the other synchronized systems may be updated without losing metadata information for those items.

A. Functional Overview

In an embodiment, one or more client terminals can access a file system on a server. One or more files can be downloaded from the file system and manipulated on the client terminal. In particular, a user may perform certain acts on the content of the downloaded file, including editing documents, deleting items, creating new documents for the file, moving items or copying items within the file, or combinations of these acts. Under an embodiment, a management system detects the acts performed on the downloaded file. The management system then synchronizes the downloaded file with a corresponding portion of the file system.

As described herein, the file system is part of an overall management system that keeps numerous files for multiple clients. A client may download only a portion of the file system. The portion of the file system may include items such as directories, sub-files, applications, executables, documents, and individual resources of different data types.

When portions of the file system are downloaded by a client, the resulting local file is referred to as a working version. The working version copies the items from the portion of the file system selected to be downloaded for the client. Information is recorded in a comparison file about the working version when it is created. The comparison file may also include information about the portion of the file system downloaded. This information includes metadata information that can subsequently be used to identify file items, as well as modifications made to the working version after it is created. After the working version is modified, the working version can be synchronized with the portion of the file system used to download the working version. Information recorded in the comparison file is used to detect the changes made to the working version.

As used herein, reference to the term "item" means data structures that can be maintained and/or managed within file systems. As noted, items include directories, files, applications, executables, documents, and individual resources of different data types. The item may include a document or resource of a particular data type. For example, a first item may be a word processing document, and a second item may be a folder than stores the document with other resources.

Under an embodiment, information included in the comparison file is primarily metadata information. The metadata information may include location information for a particular item, creation times, modification times, item size, and file names.

A location is identifiable by a memory address and computer location. Location information refers to data that can be used to identify the memory location of the item on a computer. Location information may include a file or resource name. Location information may also include a file path locating a particular item in memory.

Embodiments of the invention include a system and method of managing files. According to one embodiment, after a first synchronization operation, information is mapped from a file system to a comparison file. The information includes information about the status, after the first synchronization operation, of a first item. For example, the information in the comparison file may indicate that the first item was located at a first location after the first synchronization operation. In addition to mapping the file system information to the comparison file, a working version of the file system is made. Initially, the working version indicates that the first item is at the first location. The information contained in the working version is modified to reflect any changes made to the status of the first file after the first synchronization operation. During a second, subsequent synchronization operation, the location indicated in the working version of the file system is compared with the location indicated in the comparison file to determine whether, during the interval between the first synchronization operation and the second synchronization operation, the first item has be moved.

In an embodiment, the first item in the file system may be moved to a new location that is identifiable by new location information. Therefore, the file system does not have to recreate the first working item if the first working item is moved. Rather, the file system can move the first item corresponding to the first working file to a corresponding location in the file system. In contrast to previous synchronization applications, such an embodiment of the invention does not require the first working item to be recreated as a new part of the file system just because it was moved on the working version. As a result, communication resources are preserved because a data transfer of the contents of first working item is not necessary. Furthermore, metadata information for the first item in the file system is preserved.

Another embodiment of the invention maps information about a file system to a comparison file. A working version is made of a portion of the file system. During a synchronization operation, the comparison file and the working version are used to determine whether items have been copied since the last synchronization operation.

Another embodiment of the invention provides a computer system that can operate a network management application. The computer system includes a network interface to exchange communications with a second computer. The communications are to create a working version of a file system portion accessible on the second computer. The first computer includes a memory that stores the working version. A processor on the first computer records a creation time for at least one working item in the working version, where the first working item originates from a first item of the file system. The processor subsequently uses the creation time to determine if an operation was performed on the first working item.

Among other advantages, embodiments of the invention can detect if an item was moved to a new location after the working version was created, if an item was copied from another item existing in the working version when it was created from another file, or if an item was copied from an item added to the working version subsequent to its creation. Other operations that can be detected under an embodiment of the invention include if an item was edited, or deleted from the working version. An embodiment of the invention can also detect multiple operations performed on or for an item in the working version.

The result is that a portion of a file system used to create the working version can be updated to reflect subsequent changes in the working version. However, items in the file system that are subsequently updated by working version items do not need to be entirely replaced, or be recreated by the working version items. Rather, a synchronization method or application can update the file system to reflect changes to corresponding items of the working version, or to additions of items to the working version. Another advantage is that file system items that are operated on in the working version can maintain information that tracks their origin. As a result, the file system can be updated to reflect only those operations performed on the working version.

B. System Overview

FIG. 1 illustrates a system for managing files shared between computers, under an embodiment of the invention. The system includes a first terminal 10 coupled to a server 20 via a network 15. A plurality of other terminals 25 may also be coupled to server 20 over network 15. The first terminal 10 may be operated as a client that communicates with server 20. In an embodiment, a client application is operable on first terminal 10 to manage file items and resources that are shared with server 20.

A user may operate first terminal 10 to access a file system 40 containing one or more resources and other items from server 20. The original version of the file system 40 may remain on server 20 while the user works on a borrowed or working version of a portion of the file system 40. A system such as described by FIG. 1 enables the user to work locally on items accessed from a remote server 20, then update file system 40 on the remote server to reflect changes made on first terminal 10 to those items.

In an embodiment, the user on terminal 10 can perform operations on items accessed from server 20. These operations may include editing content, deleting particular items retrieved from the server, moving items to new locations, copying items retrieved from server 20, and adding new items for subsequent inclusion on server 20. In addition, an embodiment of the invention allows a user to update server 20 to reflect combinations of operations performed on items. An embodiment of the invention reduces possible combinations of operations performed by the user into equivalent compound operations. The equivalent compound operations may include editing and copying an item, creating new items then editing them and/or copying them, as well as editing existing items and then editing them.

In an embodiment, terminal 10 exchanges communications with server 20 using a network interface 12. In one implementation, network interface 12 enables Internet Protocol (IP) communications, and specifically Transport Control Protocol (TCP/IP) for enabling communications over networks such as the Internet. Alternatively, embodiments of the invention may signal communications between computers over networks such as Local Area Networks (LANs) and other types of Wide Area Networks (WANs).

The server 20 may be used to store or otherwise manage a file system 40. In an embodiment, file system 40 includes a plurality of portions, where each portion is associated with a user or an account. A first portion 46 of file system 40 may be a file stored on server 20, that is accessible to first terminal 10, or to a user of first terminal 10. The first portion 46 may include a plurality of items, such as files and resources of particular data types.

A first item 44 of first portion 46 is identified in FIG. 1. For illustrative purposes, first item 44 is assumed to be a resource such as a document. Alternatively, first item 44 could be a file containing other items. The first item 44 includes or is otherwise associated with metadata information and content. The metadata information of first item 44 may identify a particular location (L1) on a memory (not shown) of server 20. The metadata information of first item 44 may also include a location identification information (LI1) used to locate the first location (L1) on server 20. Since first item 44 is assumed to be a resource, first item 44 also includes a content associated with the metadata information.

In an embodiment shown, first terminal 10 receives a first communication 32 from server 20, signaled over network interface 12 and network 15. The first communication 32 includes first portion 46 of file system 40. In one implementation, a user operating first terminal 10 has access rights to first portion 46. The access rights enable the user to download or otherwise retrieve some or all of first portion 46, including first item 44. The user can make a working version 50 of first portion 46 after receiving first communication 32. The working version 50 includes content from items in first portion 46. Certain metadata information for working version 50 may be transferred from server 20 and included in first communication 32. Other metadata information may be generated on first terminal 10 when working version 50 is made. Metadata information transferred over from the file system may include, for example, location information such as file paths and names to locate certain items.

Data signaled with first communication 32 may be used to generate working version 50, including at least a first working item 56. The first working item 56 originates from first item 44 of file system 40. In an embodiment, the first working item 56 originates from first item 44 because a content portion 58 of first working item 56 is copied from a corresponding content portion 48 of first item 44.

Metadata information that may be carried over from file system 40 includes the first location information (LI1) of first item 46. The first location information (LI1) may be used to identify a second location (L2) for first working item 56 on first terminal 10. For example, the first location information (LI1) may include a file path and a name. The file path may be recreated on working version 50 to enable first working item 56 to be located at the second location (L2). The name may be transferred over also as additional location information. In many applications, the name is an inclusive portion of the file path.

When working version 50 is generated on first computer 10, new metadata information is recorded. The new metadata information may include time values that mark certain events for first working item 56. In an embodiment, a first time value 62 may correspond to a creation time for the first working item. A second time value 64 may correspond to a modification time for first working item 56. The first time value 62 and second time value 64 are initialized upon or just after working version 50 is generated on first computer 10. As an example, a user may download a word processing document as first working item 56. When the document is downloaded, first time value 62 (creation time) and second time value 64 (modification time) are recorded by an operating system (or other application) on first terminal 10. For example, first terminal 10 may run a WINDOWS type operating system that automatically records creation time values and modification time values when first working item 56 is generated. The creation time is a value assigned to a particular item marking the time of its creation on a particular computer system. The creation time is stored as a static value that can be used subsequently identify a corresponding working item, even if that working item has a new address or a new name. The modification time is a value associated with the working items to mark the last instant that the item was edited or created. The modification time can therefore change after working version 50 is downloaded from file system 40.

In an embodiment, first computer 10 maintains or otherwise accesses a comparison file 70 to store metadata information. The metadata information stored in comparison file 70 may include new metadata information recorded when first working item 56 is generated on first computer 10, as well as certain metadata information that may be carried over from first item 44 of file system 40.

In the example provided, comparison file 70 stores the first location information (LI1) of the first working item 56 and the first item 44, the second location (L2) of the first working item 56, the first time value 62 (creation time) of the first working item 56, and the second time value 64 (modification time) of the first working item 56. The first location information (LI1) is transferred from server 20, while other metadata information in comparison file 70 is created with generation of working version 50. The metadata information at the initial moment for items in working version 50 are generated and stored in comparison file 70. As shall be described in greater detail hereafter, this metadata information is used to identify the specific operations that are performed on first working item 56 after the working version 50 is made. By knowing the specific operations, synchronization may be performed more efficiently.

The operations that comparison file 70 may be used to detect include the operations of editing items, moving items, making new items, copying items, deleting items and combinations thereof. Comparison file 70 provides access to metadata information for each item signaled with first communication 32. Subsequent to operations being performed on working version 50, an embodiment of the invention provides that metadata in items of working version 50 are compared against comparison file 70. The comparison of metadata information is used to detect the operation(s) performed on working version 50, for purpose of determining differences between working version items and file system items. In making the comparison, items in working version 50 may be detected as having metadata information that are different from metadata of corresponding items recorded by comparison file 70. In addition, items in working version 50 may be detected as not having a corresponding item identified by comparison file 70. The differences identified when making the comparisons are noted and used to synchronize the working version 50 with first portion 46 on file system 40.

Under an embodiment of the invention, first portion 46 is a shared file accessible to other terminals 25 from server 20. It is possible that first portion 46 is changed by another computer after portions of it are signaled to the first terminal 10. The other terminal 25 may, for example, access and operate on items in first portion 46 so that first portion 46 is changed from the time it is signaled to first terminal 10. In order to make the comparison for identifying the changes in working version 50 with shared file system 40, a second communication 34 is signaled to first terminal 10 from server 20. The second communication 34 includes metadata information as existing on server 20 at the moment synchronization is to be performed with first terminal 10. In an embodiment, second communication 34 is signaled to first terminal 10 upon a synchronization request being made from the first terminal 10.

In an embodiment, first terminal 10 performs the synchronization operation. The synchronization operation may compare metadata information between changed or added items of working file 50 and items of first portion 46. The changed or added working version items are the result of the first terminals users performing one or more operations on working version 50. Changed or added file system items are the result of other users performing one or more operations on their versions of file system 40. The differences between working version 50 and items of first portion 46 are identified and reconciled by the user of first terminal 10. The differences are recorded as reconciled metadata information. In an embodiment, a third communication 36 is used to signal the reconciled metadata information from first terminal 10 to server 20. The reconciled metadata information may be signaled to server 20 to cause server 20 to perform one or more operations that update file system 40 so as to reflect changes from operations performed on working version 50. Furthermore, the reconcile information may be displayed by the user 50 so that the user can select changed or altered items that will be used to update file system 40.

In another embodiment, first portion 46 is not shared with other users, but only with the user of first terminal 10. As such, second communication 34 may not be necessary. Rather, comparison file 70 is used to perform the synchronization operation and to identify reconciled metadata information. The reconciled metadata information is then signaled to server 20 after the synchronization operation is performed on first terminal 10. The reconciled metadata information is signaled to server 20 to cause it to update file system 40 with changes of working version 50.

C. Synchronization Operations

Figure 2:
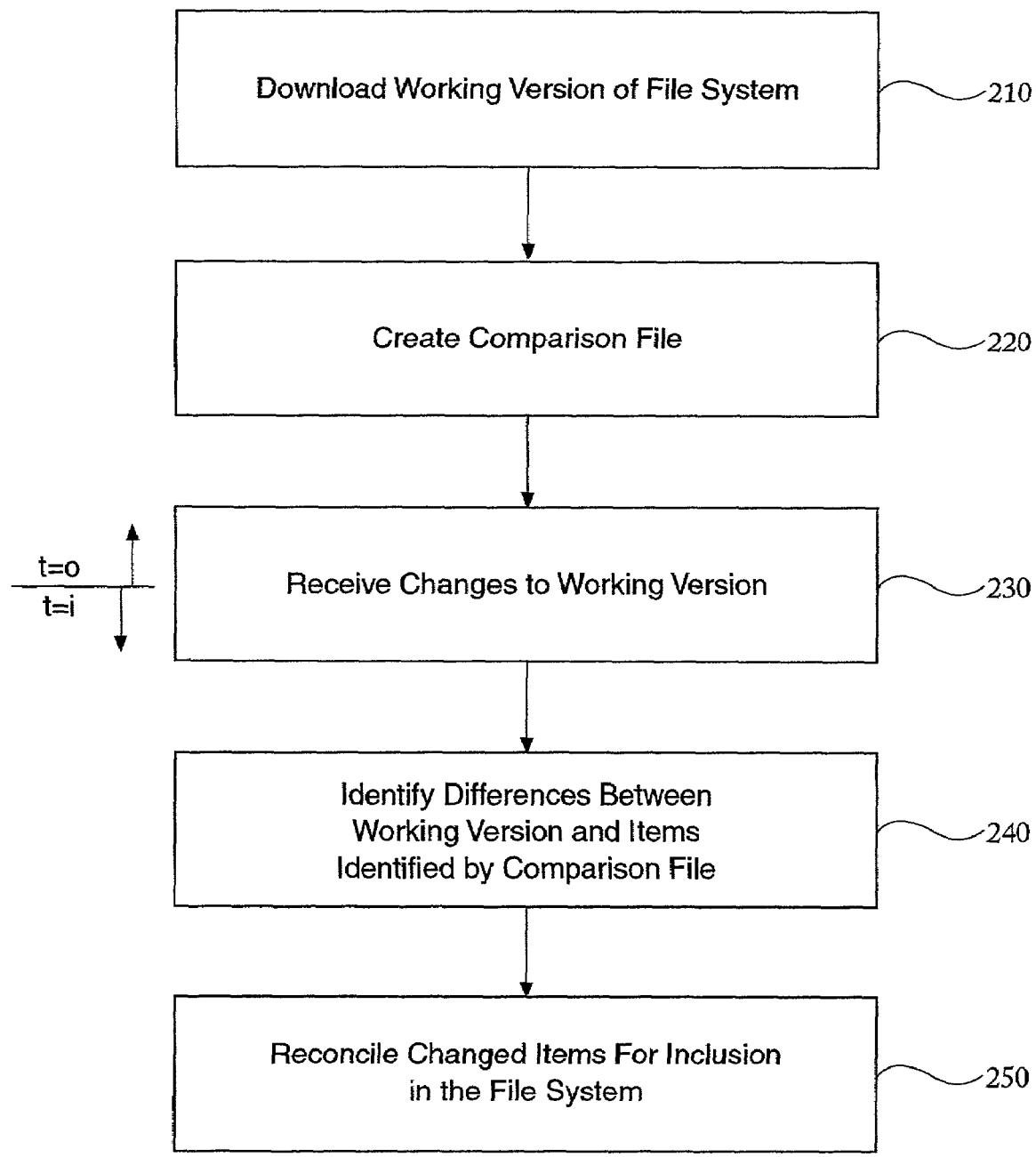
FIG. 2 is a flowchart describing synchronization on a terminal, under an embodiment of the invention.

FIG. 2 illustrates a method for making working version 50, and subsequently synchronizing working version 50 (FIG. 1) with a corresponding portion of file system 40. Reference to components of FIG. 1 is intended to communicate exemplary components for use with that embodiment. In an embodiment such as described with FIG. 2, it is assumed that first file system 40 is not shared with other users.

In a step 210, a working version of file system 40 portion is downloaded onto first terminal 10. For example, first terminal 10 may connect with server 20 over the Internet. The user of first terminal 10 may have an account to identify first portion 46 of file system 40. The first portion 46 of file system 40 can be selected by the user to be downloaded onto first terminal 10.

In step 220, comparison file 70 is generated when working version 50 is made. The comparison file records initial metadata information of working version 50. Some of the metadata information may also be transferred from items of first portion 46 of file system 40. Steps 210 and 220 are performed at t=0, prior to any operations that may affect working version 50. Steps 230-250 occur after some time t=i, so that the user may have performed an operation on working version 50. At that time, the user is making a request to synchronize working version 50 with file system 40.

In step 230, differences are identified between modified working version 50 and working version 50 at the time comparison file 70 was created. The differences may be referred to as delta items. The delta items include items in working version 50 at the later time that are new, copied, moved, or modified. The delta items may also include items identified by comparison file 70 that have no correspondence or counterpart in working version 50. For example, first working item 56 may be operated on through edits and moves, in which case it is a delta item in working version 50. Alternatively, comparison file 70 may identify working item 56, but working item 56 may have been deleted from working version 50. In this case, first working item 56 is a delta item in comparison file 70. Similarly, other working items may be copied or added to working version 50 after comparison file 70 is made, in which case those items are identified as delta items in working version 50.

In step 240, differences between items in working version 50 and comparison file 70 are identified. As discussed, these differences are also referred to as delta items.

In step 250, differences identified between working version 50 and items identified by comparison file 70 are reconciled. To reconcile, delta items may be selected for instructing file system 40 to be updated. For example, if a delta item is an edited version of first working item 56, then the selection specifies whether file system 40 is to include the edited or the original version of first item 44. If a delta item is an added item (such as a new or copied item) to working version 50, then the selection determines whether file system 40 is to keep those additions. If the delta item is first working item 56 moved to a new location, then the selection determines whether file system 40 is to use new location information for first item 44, or whether the file system is to maintain the old location. If the delta first working item 56 deleted from working version 50, the selection specifies whether file system 40 is to delete first item 44. Similar methods may be performed with combinations of operations, as detailed elsewhere in this application.

Figure 3:
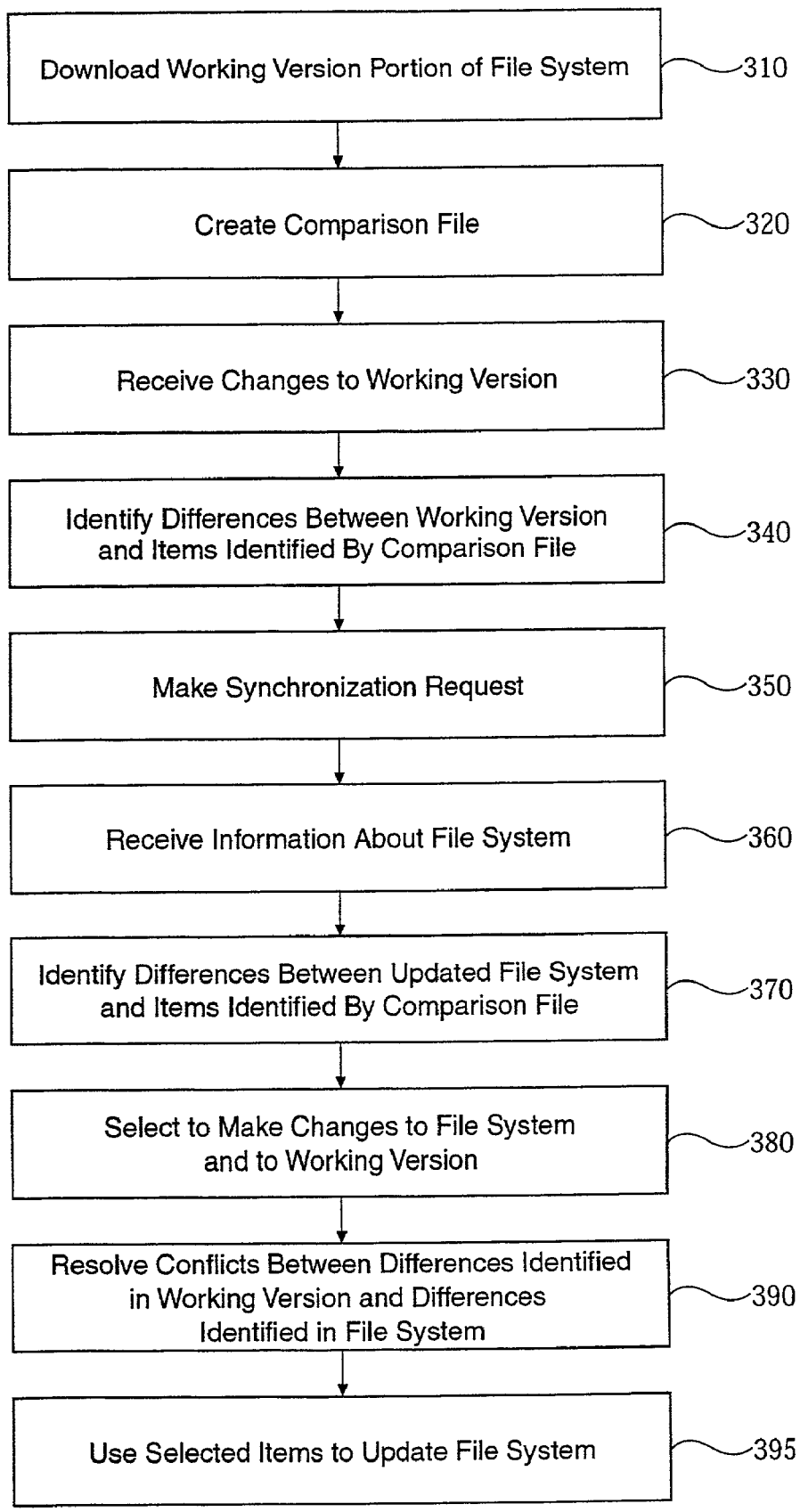
FIG. 3 is a flowchart describing synchronization of a file shared by many users on a terminal of the system, under an embodiment of the invention.

FIG. 3 details a method for synchronizing working version 50 with file system 40 on server 20, when system 40 is shared with other computers, under an embodiment of the invention. In FIG. 3, working version 50 is made as described with an embodiment of FIG. 2. The working version 50 is downloaded from file system 40 in step 310. Comparison file 70 is created to record metadata information about working version 50 and file system 40 in step 320. Changes are made to working version 50 in step 330. Differences between the working version 50 and items identified by comparison file 70 are identified in step 340. These items, referred to as delta items, may include working version items that have at some point been moved, deleted, edited, are added through one or more operations.

In step 350, the user of first terminal 10 makes a synchronization request with server 20. By this time, working version 50 may have been modified from its original state by one or more operations.

In step 360, new information is received about file system 40 on first terminal 10. The file system 40 may have been accessed and altered by other terminals since the time working version 50 was generated on first terminal 10. Therefore, new information about file system 40 may identify changes made to items of the file system 40 by other users. In one implementation, information about the file system 40 is in the form of metadata, and may be particular to items of first portion 46 downloaded by the user of first terminal 10. The metadata information may include location information of file system items that correspond to the downloaded items. In addition, the new metadata information about file system items may include time values. For example, create time and modification time values of the file system items at the time the synchronization is requested may be signaled to first terminal 10 for purpose of determining delta items of file system 40.

In step 370, differences, or delta items, are detected between the update file system 40 and the file system at the time the working version was made. These delta items are identified by new metadata information received in step 360 compared to items identified by comparison file 70 when the comparison file was created in step 320. The delta items identified in this step may be identified by either comparison file 70 or by the new metadata information received about file system 40. Delta items identified by new metadata information about file system 40 may correspond to items that were moved or edited by other users. In addition, delta items of file system 40 may include items added to first portion 46 by other users, either as new items or copies of other items. Delta items identified by comparison file 70 include items deleted from file system 40 after working version 50 is made on first computer 10.

In step 380, selections are made for delta items identified in step 340 and in step 370. The selections may be made by a user. The selections may specify delta items of comparison file 70, working version 50, and file system 40. For each delta item, the selection may determine whether to keep that delta item or not.

In step 390, conflicts between differences identified in steps 340 and 370 are detected and resolved. For example, an item in the working version 50 may be edited, so that it is identified as a delta item when compared to a corresponding file system item at the time working version 50 was made. That file system item identified in comparison file 70 may be subsequently changed by another computer having access to server 20. Thus, two delta items may be associated with the same item identified by comparison file 70. In an embodiment, the user of first terminal 10 can choose which of the two delta items should be used for inclusion in file system 40.

Alternatively, conflict selections between delta items may be made through a conflict protocol that selects whether each delta item is to be incorporated into the synchronized file system 40.

In step 395, the selected delta items are used to update file system 40. Each delta items identified in step 340 and 370 may be omitted or included in the file system's update. The user can select between delta items in conflict.

Figure 4:
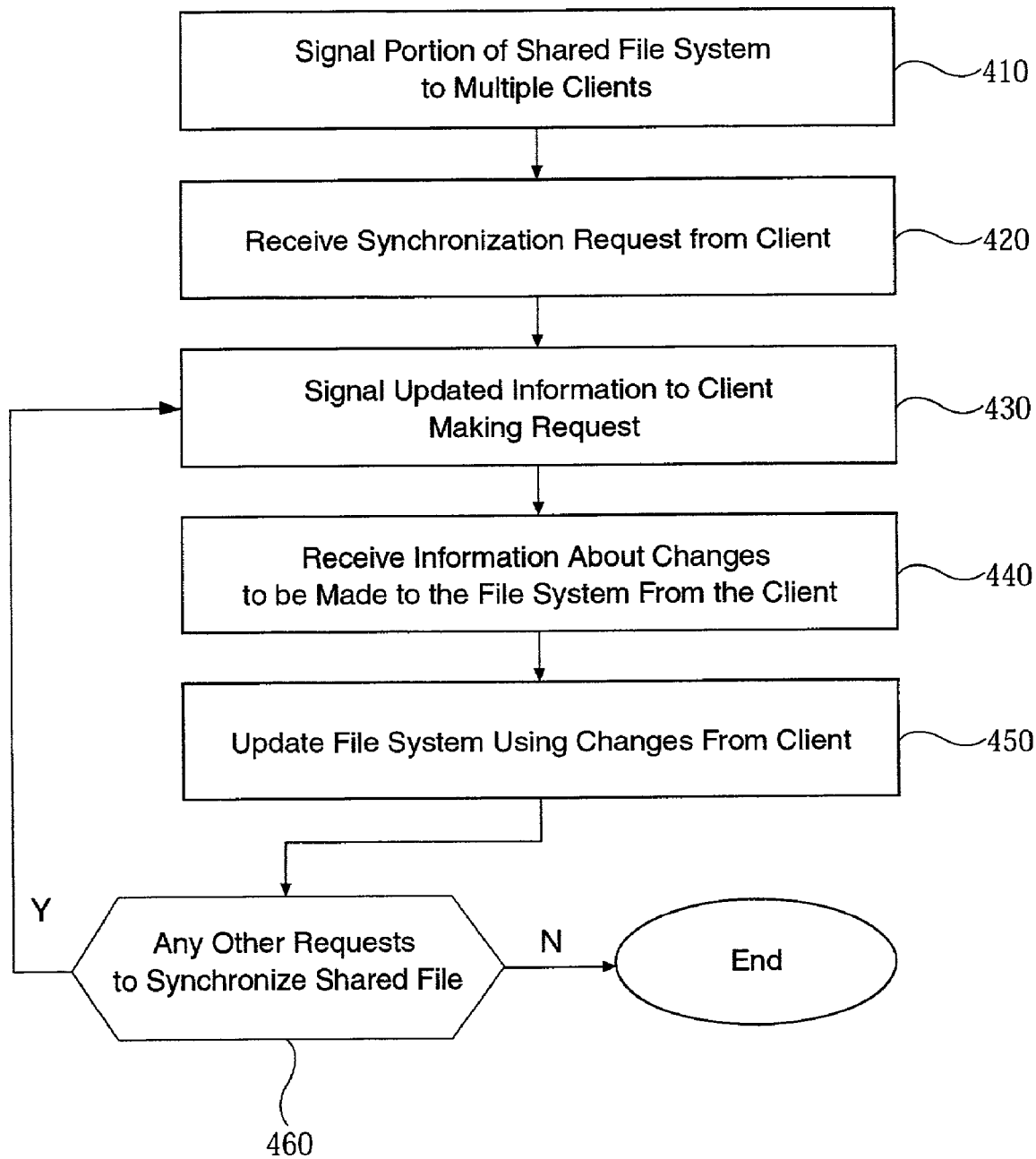
FIG. 4 is a flowchart detailing synchronization of a shared file system on multiple terminals, under an embodiment of the invention.

FIG. 4 illustrates a method for operating server 20 under another embodiment of the invention. In an embodiment such as described with FIG. 4, multiple users are assumed to access shared file systems on server 20. Reference is made to FIG. 1 for descriptive purposes. The first terminal 10 is assumed to be making the synchronization request. Portions of file system 40 is shared with other clients 25 who can access server 20.

In step 410, a portion of the shared file system 40 is signaled to first terminal 10 and clients 25. Each client may be operated separately to access and receive portions of the shared file system.

In step 420, a synchronization request is received from first terminal 10. The synchronization request may correspond to a user wishing to implement their changes to the file system 40. The users may also wish to receive any changes entered from other users who downloaded the portion of the file system 40.

In step 430, updated information about the file system 40 may be signaled to the client requesting the synchronization. The file system 40 may be updated from the time that client downloaded the file system to include changes entered from clients 25.

In step 440, server 20 receives information about changes that are to be made to file system 40 as a result of operations performed on working version 50. The changes may be the result of operations such as edits, additions (new items and copies), deletions, and moves.

In step 450, file system 40 is updated using changes signaled from first terminal 10 (the client making the synchronization request). The updated changes may be selections decided by a particular user after performing one or more operations on that terminals working version of the file system 40.

In step 460, a determination is made as to whether any other requests are made or will be made from other terminals that access file system 40. If there are other requests to synchronize, then step 430-460 are repeated for the next client making the request. Under such an implementation, each client having access to the shared file system 40 makes additional changes to it. The changes and alterations made by other users are incorporated in file system 40 when the synchronization request is made. Therefore, file system 40 changes after each synchronization operation with one of the clients, so that the next client is synchronizing with a previously updated file system 40.

D. Detecting Operations on Working Files

With reference to exemplary components of FIG. 1, embodiments of the invention enable synchronization between items of the working version 50 and items of the file system 40, even after the items undergo multiple and different types of operations. The operations that can be performed on working version 50 may be characterized as a primary operation or a compound operation. Under an embodiment, multiple operations performed on an item can be detected as one of a set of equivalent compound operations.

In an embodiment, the primary functions are edit, delete, copy, move and create new. The edit operation results in a content of an item in working version 50 being changed. The delete operation causes an item to be removed from the working version 50. The copy operation recreates the contents of an item in working version 50 as a new or added item. The move operation causes an item located in one location of the working version 50 to be given a new location. A location may be defined by a name, a memory address and a memory unit. Thus, the move operation may be performed to move an item to a new folder location, to rename an item, or to move the item to a new memory unit. The create new operation is performed on the working version 50 to create an additional item to the working version 50.

A compound operation is a combination of multiple operations performed on the working version 50, to create and/or affect a working version item. In contrast to embodiments of the invention, previous synchronization systems are able to detect performance of some of the primary operations, but are unable to detect certain primary operations, or combinations of operations. Advantages provided by embodiments of the invention enable detection and synchronization of all the primary operations, as well as combinations of multiple operations performed on individual items of working version 50. Analytical expressions for describing operations of file management may be described using the format aOb, where the capitalized letter stands for the operation, an item preceding the operation represents the source for the operation, and an item following the operation represents the destination for the operation. To summarize the primary operations:

Ex—Edit file X
Dx—Delete file X
Nx—Create new item X
xMy—X is moved to Y
xCy—X is copied as Y Under an embodiment of the invention, compound operations can be reduced and abstracted to a finite number of equivalent compound operations. Some examples of principles uses in making these abstractions include: (1) if an item is deleted, previous operations performed on that item can be ignored; (2) multiple moves of an item can be treated as one move, from the initial source to the final destination; and (3) any move operation performed on a combination of operations can be analyzed in any order with respect to other operations, so assuming a move is performed before another operation provides a true and simplified result. Using these principles, it can be assumed that any working item undergoes one of nine possible operations or combinations of operations, where the combinations of operations are equivalents of other operation combinations. The operations performed on items of working version 50 can be replicated for file system 40 as either one of the five primary operations, or one of four equivalent compound operations. In an embodiment, the four equivalent combinations of operations are:

ExMy—Edit X and move it to Y
(Nx)Cy—Create X and copy it as Y
E((Nx)Cy)—Create X, copy it as Y, and edit Y
E(xCy)—Copy X as Y, and edit Y Parentheticals are to be performed first in any equivalent compound operation.

Figure 5:
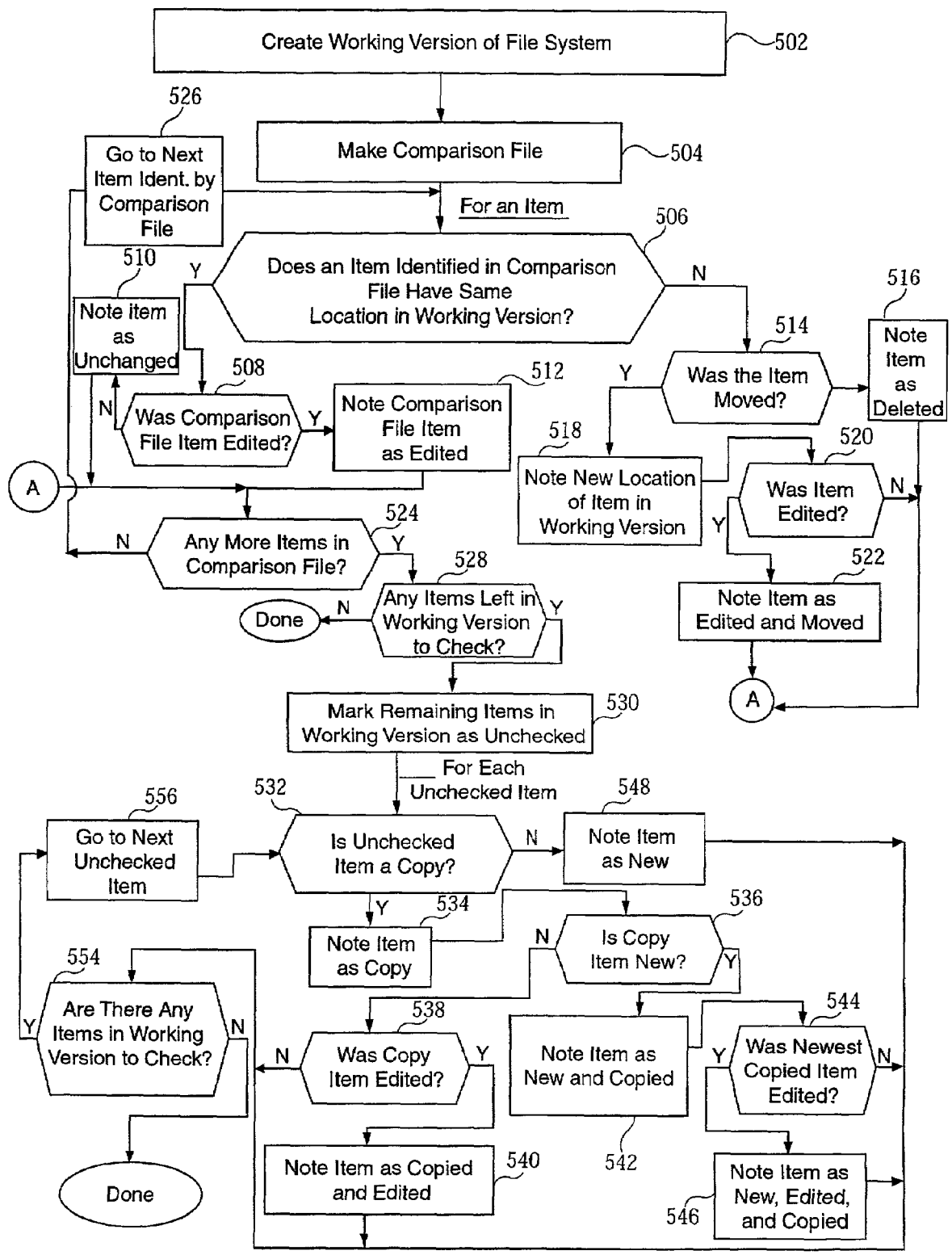
FIG. 5 is a flowchart detailing detection of multiple operations and compound operations on a working version of a file system, under an embodiment of the invention.

FIG. 5 illustrates a method for detecting operations performed for items in working version 50 at the time a user requests to synchronize the working version 50 with file system 40, under an embodiment of the invention. In an embodiment such as shown, there are ten possible outcomes for each item in the working version 50 at the time of synchronization: unchanged, five prime operations, and four equivalent combinations of operations.

In step 502, working version 50 is created from a portion of file system 40. In step 504, a comparison file 70 is made that includes information about the working version 50. Both steps 502 and 504 are assumed to take place before any operations are performed for the working version items (i.e. at t=0). At a subsequent moment, the user requests synchronization with the file system (i.e. at t=f). From between t=0 and t=f, the user may perform one or more operations that alters working version 50.

Upon receiving a synchronization request, a determination is made in step 506 as to whether an item identified and located by comparison file 70 has a same location as a corresponding item in working version 50. Initially when comparison file 70 is made, the location of each item is recorded. Thus, step 506 determines whether an item identified in comparison file 70 can still be located using location information initially recorded for that item.

If step 506 determines that the item identified by comparison file 70 still has the same location within working version 50, step 508 follows with another determination as to whether that item was edited subsequent to being recorded in comparison file 70. If step 508 determines the item was not edited, then step 510 concludes that the particular item was unchanged in working version 50. If step 508 determines that the particular item was edited, then step 512 notes the item identified by comparison file 70 as edited.

If step 506 determines that the item identified by comparison file 70 was not located by information recorded for that item, then step 514 makes a determination as to whether the item was moved. If the determination is that the item was not moved, step 516 notes the item as being deleted. If the determination is that the item was moved, then step 518 notes the new location of the item in working version 50. Then a determination is made in step 520 as to whether the moved item was also edited. If the determination is positive, then the item is marked as moved and edited in step 522.

Step 524 makes a determination as to whether any more items identified by comparison file 70 remain to be checked. Step 524 follows step 510 if the previous item was determined to be unchanged. Step 524 follows step 512 if the previous item was noted as being edited. Step 524 follows step 516 if the previous item was noted as deleted. Step 524 follows step 520 if the previous item was noted as moved. Step 524 follows step 522 if the previous item was noted as moved and edited. If step 524 determines items remain that are identified by comparison file 70, and that these items have not been checked, then step 526 provides the next item identified by comparison file 70 is to be checked. For the next item, the method is repeated beginning with step 506.

If step 524 determines no items identified by comparison file 70 remain to be checked, step 528 determines if any items remain in working version 50 unchecked. The unchecked items are working version items that were not checked as a result of comparison file items being checked in steps 506-524. If there are no unchecked items in working version 50, the method is done. Else, the remaining items in working version 50 are marked checked in step 530.

Step 532 determines whether an unchecked item in working version 50 is a copy. If the determination is positive, step 534 notes the item as a copy. Step 536 determines whether the copied item was copied from another item that was created new in working version 50.

If the determination in step 536 is negative, step 538 determines whether the copied item was also edited after being made in step 538. If the determination in step 538 is positive, step 540 notes the copied and edited.

If the determination in step 536 is positive, the item is marked as new and copied in step 542. In other words, the item is noted as being copied from another item that was created as an original, after working version 50 was created from file system 40. In step 544, a determination is made as to whether the new and copied item was also edited. If the determination in step 544 is positive, the item is noted as new, copied and edited.

If in step 532 the determination is that the item is not a copy, then in step 548 the item is noted as being new.

Step 554 determines whether any items marked as unchecked remain in working version 50. Step 544 follows one of these steps: if the determination in step 538 is negative, so that the item is noted only as being copied; step 540 if the item is determined to be copied and edited; step 548 if the item is determined to be only new; if the determination in step 544 is negative, so that the item is determined to be new and copied; and step 546 if the item is determined to be new, edited and copied. If step 554 determines that items are remaining that are unchecked in working version 50, step 556 iterates to the next unchecked item. Then the method is repeated for the next item, beginning with step 532. If step 554 determines that unchecked items are not remaining in working version 50, the method is done.

As shown by an embodiment of FIG. 5, a synchronization operation may detect ten possible outcomes for each item being synchronized. Each item may be determined as being unchanged since being downloaded (step 510). Otherwise, each item being synchronized may be determined to be a result of one or more operations performed by a user after working version 50 is created. Five prime operations are detected: edit (step 512), move (step 518), delete (step 516), create new (step 548), and create copy (step 534). In addition, four compound operations are detected: move and edit (step 522); new and copy (step 542); new, edit and copy (step 546); and copy and edit (step 540).

In an embodiment, a special case may arise where a working version item is deleted, and then recreated with the same name and location information. Such an item could be identified as a new item rather than a moved item if step 506 incorporates a check for the special case. Specifically, an identification such as the recreated item's creation time value may be used to check that the item was not subject to deletion and recreation in step 506.

Figure 6:
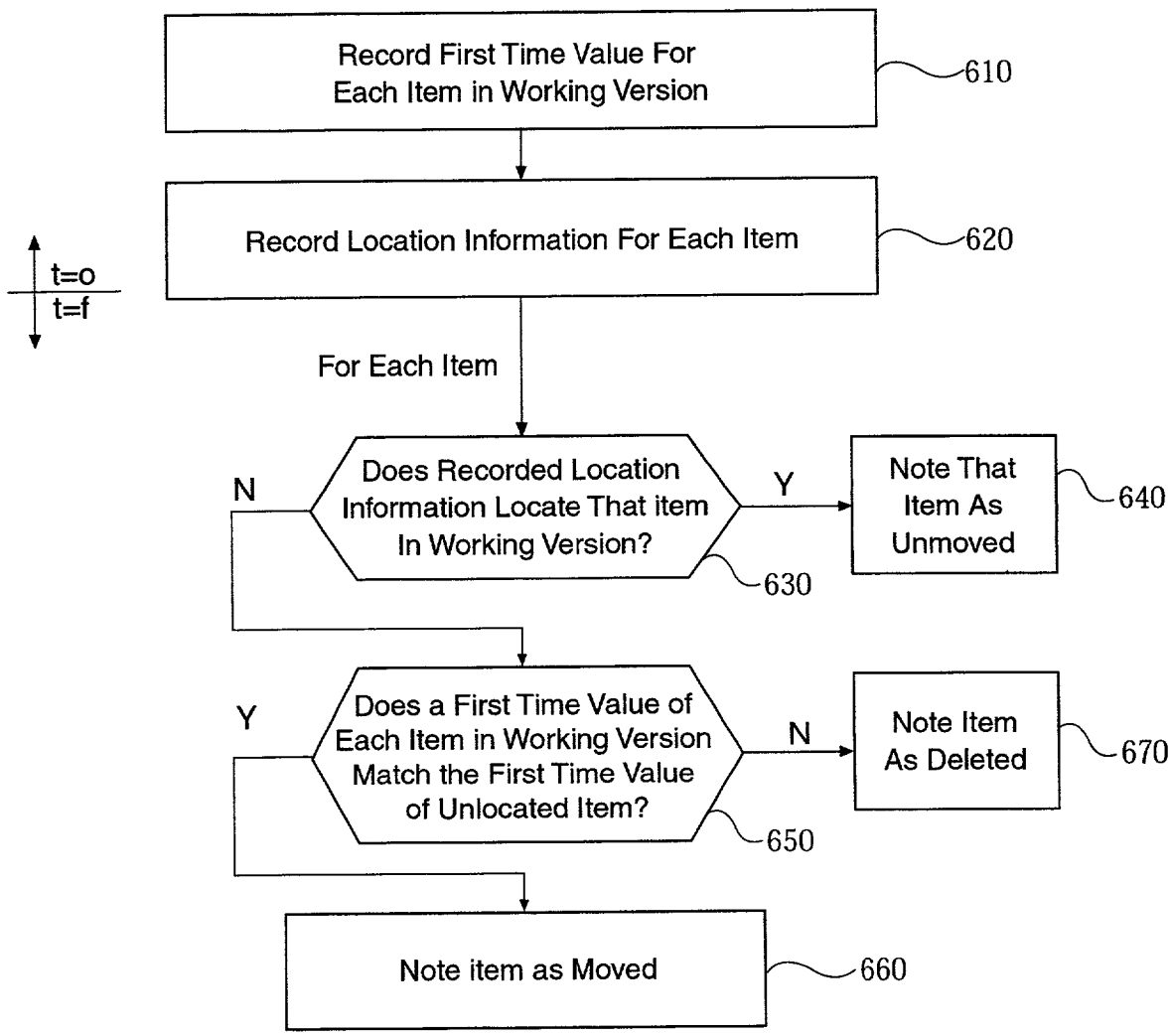
FIG. 6 is a flowchart for identifying moved or deleted items during a synchronization operation.

FIGS. 6-9 illustrate flow charts providing additional details for detecting operations performed in FIG. 5, under embodiments of the invention. FIG. 6 is a method for determining whether an item is moved or deleted. FIG. 6 may correspond to steps 514-518 of FIG. 5, under an embodiment of the invention.

In step 610, a first time value is recorded for each item in working version 50 when working version 50 is made on first terminal 10. In an embodiment, the first time value may correspond to a creation time of an item. The creation time is a property attached to items under certain operations systems, such as WINDOWS. The creation time may record a time value for an item created on first terminal 10 when that item is downloaded from another computer. Thus, when an item of working version 50 is downloaded from file system 40, the first terminal 10 may record the creation time of that item. The creation time may be significant to a thousandth of a second, or to several magnitudes greater.

In step 620, location information is created for each item when working version 50 is made. The location information may correspond to segments of file paths or names that can be used to locate an item either on file system 40 or on working version 50. Both steps 610 and 620 occur at t=0, corresponding to when working version 50 is made, and before any operations are performed. The first time value and the initial location information may be located in comparison file 70.

After step 620, the flowchart forwards to when a synchronization request is made, or at t=f. Step 630 determines whether location information recorded initially (at t=0) locates the item in working version 50 at t=f. If the determination in step 630 is positive, then step 640 records the item as not being moved. If the determination is negative, step 650 follows. Step 650 determines whether any item in working version 50 at t=f has a corresponding first time value that matches the time value recorded for the unlocated item in step 610. In one embodiment, other items in working version 50 may be checked for a creation time that matches the creation time of the unlocated item.

Given that the creation time may be carried out past a thousandth or even a millionth of a second, another item in working version 50 having the same creation time as the missing item can be assumed to be the unlocated item in a new location. If the determination in step 650 is positive, the item having the same time value is recorded as being moved in step 660. If step 650 determines that no item in working version 50 has the creation time of the missing item, step 670 notes that item as being deleted.

Figure 7:
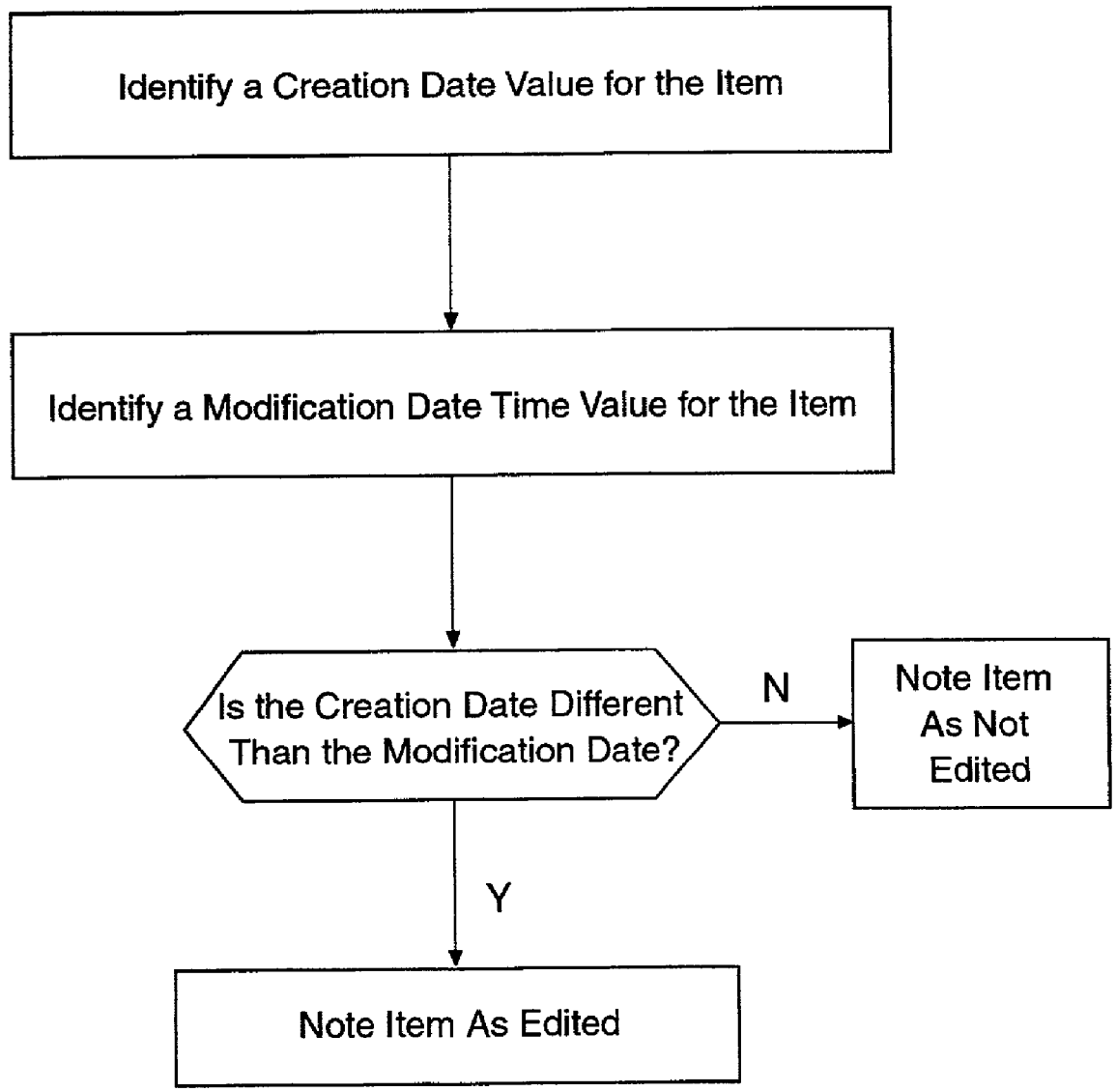
FIG. 7 is a flowchart for identifying edited items during a synchronization operation, under an embodiment of the invention.

FIG. 7 is a flowchart for determining whether any item in working version 50 has been subject to an edit operation, under an embodiment of the invention. A method illustrated by FIG. 7 may correspond to steps 508, 510 and 512 of FIG. 5. In step 710, a first time value is identified in working version 50. The time value may correspond to that item's creation time. In step 720, a second time value is identified for the same item, corresponding to that item's modification time. As mentioned, both the creation time and modification time are time values that are automatically recorded by operating systems such as WINDOWS. Both of these time values may be significant to a thousandth of a second, or even to much greater orders of accuracy. Thus, for an embodiment such as shown by FIG. 7, both the creation time and modification times are assumed to be unique to that item.

In step 730, a determination is made as to whether the modification time is different than the creation time. When an item is created, either as an original, copy or a download, an embodiment provides that the creation time and modification time are the same. Thus, if the creation time and modification times are different, step 740 notes the item as edited. Else, step 750 notes the item as not edited.

It is possible the creation time and the modification time are not initially exactly the same, but within a range of one another. An embodiment may check to determine if the modification time is outside the range of the creation time.

Figure 8:
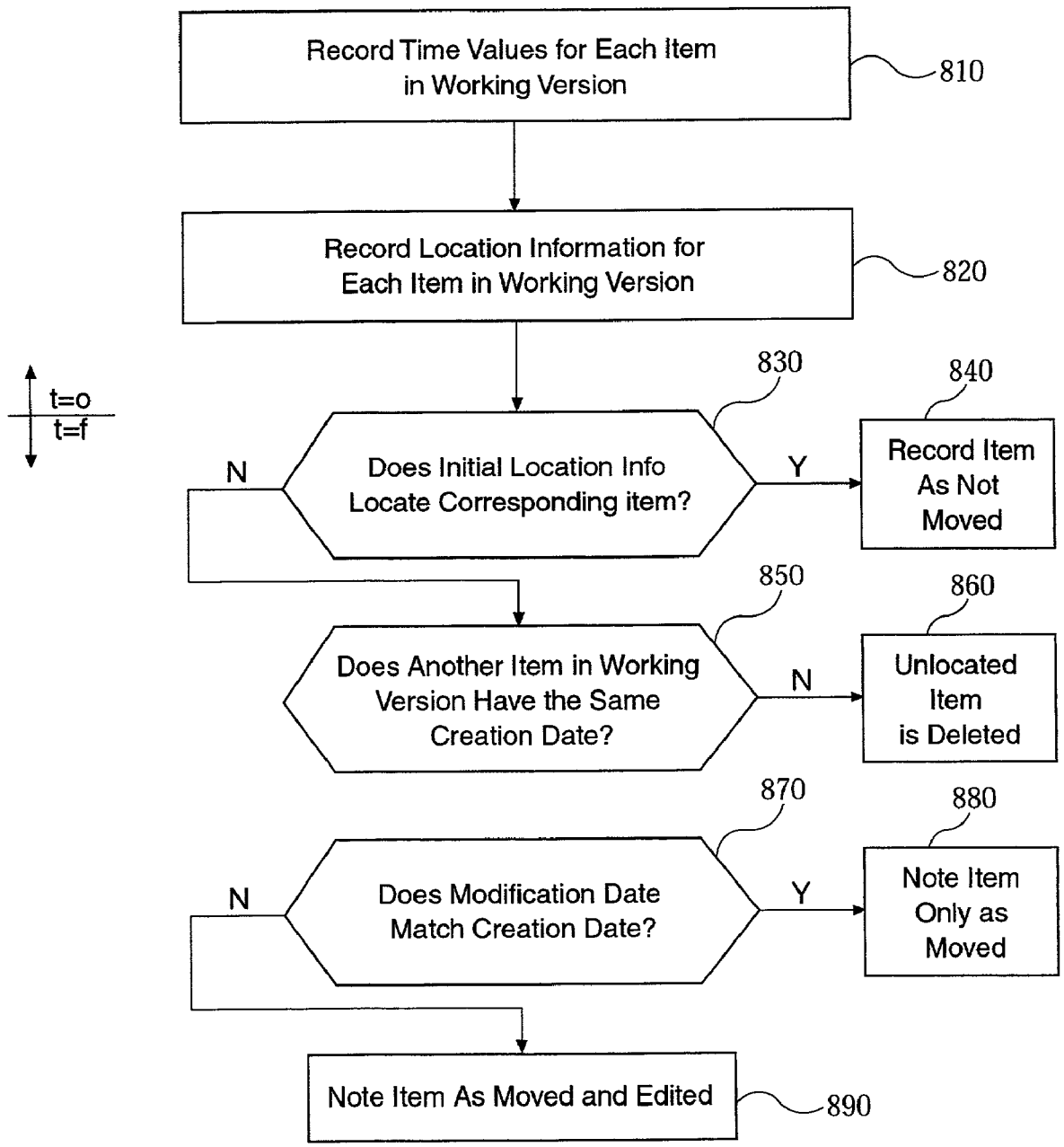
FIG. 8 is a flowchart for identifying one or more operations for an item that was edited and/or moved or deleted, under an embodiment of the invention.

FIG. 8 is a method for identifying the compound operation of edit and move, under an embodiment of the invention. In one implementation, a method as shown by FIG. 8 may be used as sub-steps for steps 514, 518, 520 and 522 of FIG. 5.

In step 810, multiple time values are recorded for each item in working version 50 when the working version is downloaded from the file system 40. As noted in other embodiments, a first one of the recorded time values corresponds to a creation time. The creation time may automatically be created by the operating system of the computer using the working version 50. The creation time and the modification time may each be recorded in comparison file 70, and associated to a corresponding item.

In step 820, location information is recorded for each item when the working version 50 is made. The location information may include segments of file paths that can locate the item in working version 50. The location information may also include a name of the item. The initial location information for each item in the working version may be recorded in comparison file 70.

In step 830, a determination is made as to whether initially recorded location information can subsequently locate a corresponding item working version 50. If the location information does locate the corresponding item, the item is recorded as not moved in step 840. If the location information recorded initially does not locate the corresponding item, then in step 850 another determination is made. Step 850 determines whether another item in the working version 50 has the same creation time as the unlocated item. If this determination is negative, then step 860 notes the unlocated item as deleted.

Otherwise, step 870 makes a determination as to whether the modification time matches the creation time for that item. If the determination in step 870 is positive, the item is noted only as being moved in step 880. If the determination in step 870 is negative, the item is noted as being moved and edited in step 890.

Figure 9:
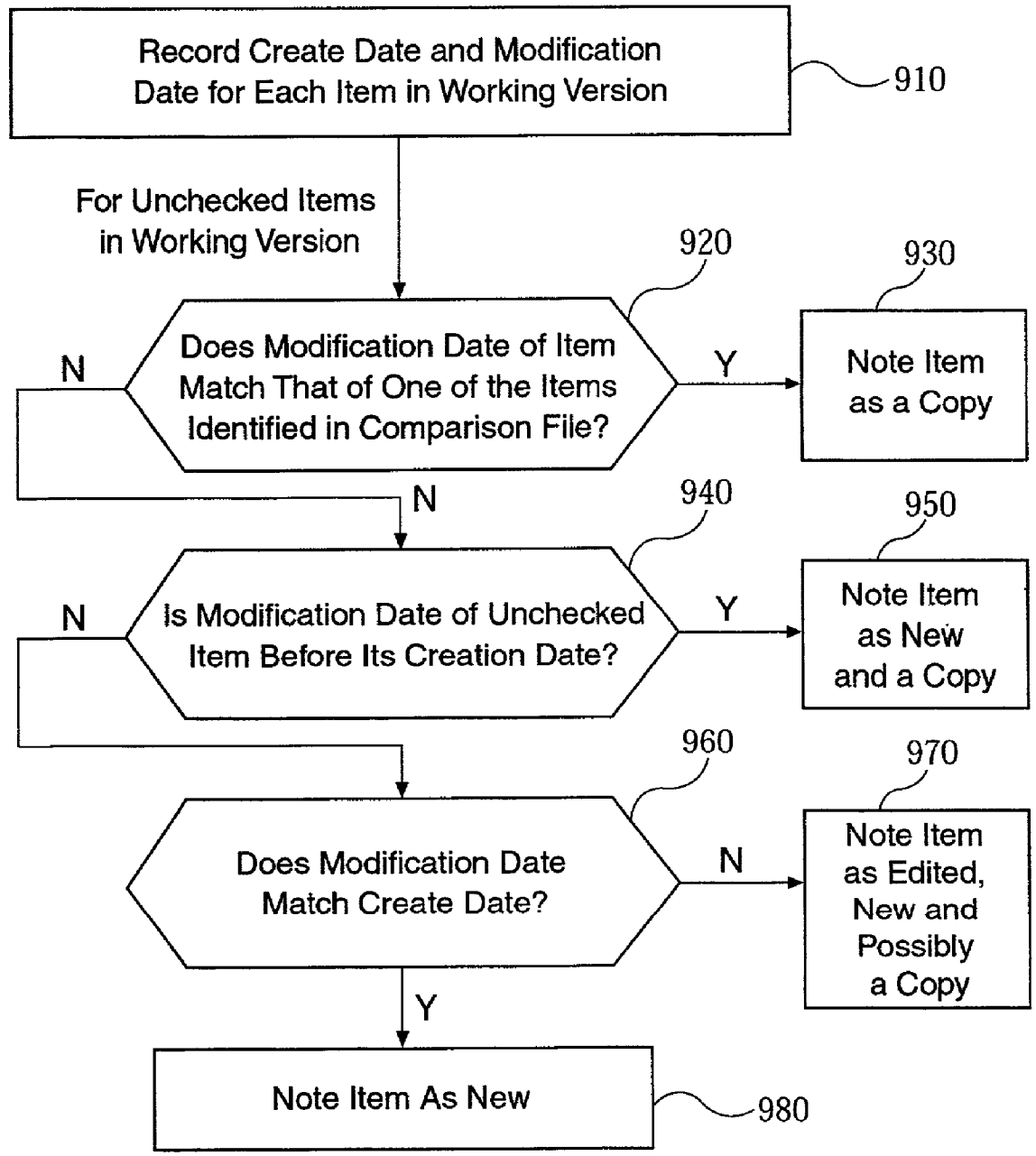
FIG. 9 is a flowchart for identifying items that have were created as new or copied from other items, and possibly edited, under an embodiment of the invention.

FIG. 9 illustrates a process for detecting one or more operations on the unchecked items in working version 50, under an embodiment of the invention. With a process shown by FIG. 9, the operations performed on the unchecked items may include at least two operations from a group consisting of create new, copy and edit. In an embodiment, a process such as shown by FIG. 9 may form sub-steps of steps 532-546 in FIG. 5.

The steps 910-980 are performed on individual unchecked items in working version 50, at the time synchronization is requested. Steps 910-980 assume certain other steps have already been performed to detect other operations that may have been performed on working version 50. Specifically, 910-980 are performed on unchecked items in working version 50. As illustrated with FIG. 5, the unchecked items are items left over after items identified by comparison file 70 are compared to items of working version 50. The unchecked items can therefore be assumed to have been created after the working version 50 was made. Thus, unchecked items are a copy and/or or a new item. The unchecked items may also have been edited after being created.

In step 910, time values are recorded for each unchecked item in the working version. For items created subsequent to working version 50 being downloaded, the creation time may correspond to when a user created that item and stored it with downloaded items in working version 50. The creation time should provide each unchecked item in working version 50 with a unique identifier. In addition, the modification time for each item in working version 50 is recorded. The modification time changes each time the corresponding item is edited. However, if the item is not edited, the modification time should be the same or very close to the creation time for that same item. In an embodiment, it can be assumed that the creation time for each item in working version 50 matches the creation time stored for that item in comparison file 70.

Step 920 determines whether the modification time for each unchecked item matches the modification time of one of the items stored in comparison file 70. An embodiment provides that modification time of a copy is the same as the modification time of its original. This feature may be implemented through an application operated on first terminal 10. In an embodiment, first terminal 10 operates an operating system that includes this attribute or feature. An example of such an operating system is WINDOWS type operating system.

If the determination is positive, step 930 provides that the item is noted as being created as a copy of another item originally downloaded from file system 40. The item can be assumed to not have subsequently been edited because the edit operation alters the modification time. If the determination is negative, then step 940 follows.

Step 940 determines whether the modification time of the unchecked item is before the creation time. If the modification time is after the creation time, step 950 notes the item as a copy of another item. This is because a copy of another item keeps the original's modification time, but is assigned a new creation time when created. Step 940 cannot be used to detect whether an item created as a copy was subsequently edited, as that would alter the modification time to be after the creation time.

If the modification time is after the creation time, step 960 makes a determination as to whether the modification time matches the creation time. Upon an item being created either as a new or copy of another item, the modification time and creation time may be exactly the same, or slightly different depending on the configuration of the operating system or other application affecting the working version 50. If the determination from step 960 is positive, step 970 provides that the item is created as a result of an operation to create a new item.

If the determination from step 960 is negative, step 980 provides that the item is edited, new and possibly also a copy. Thus, step 980 provides for two possibilities. At this point, the modification time and creation time cannot be used to distinguish between the two possibilities. To resolve between the two possibilities, an embodiment may provide that all items identified in step 980 also be subjected to one or more steps of content matching. An algorithm may be used to compare contents of all files in step 980 with contents of other files identified as being new in working version 50, for purpose of determining if a file is new and edited, or new, copied and edited. The premise may be that the latter would have contents similar to another item identified as being new.

E. User-Interface

FIG. 10 illustrates a user-interface 1000 for use with an embodiment of the invention. The user-interface 1000 enables users to elect between same items changed on different computers. For example, with reference to FIG. 1, a user on first terminal 10 may perform operations on working version items downloaded from file system 40. The file system 40 may be shared, so other users may access it over the network. The other users may operate on an item in file system 40, while a user on first terminal 10 may operate on the corresponding working version item. When the synchronization request is made, a conflict may be presented. The file system item corresponding to the altered item of the working version has been changed by another user who has accessed file system 40.

An embodiment of the invention enables the user making the synchronization request to elect between items in file system 40 and items in corresponding working version 50. An embodiment also allows the user making the request to choose how to decide conflicts between file system items updated by other computers and by working version items on the computer making the synchronization request.

The user-interface 1000 includes a first column 1110 and a second column 1120. The first column provides information about delta items on first computer 10. The second column 1120 provides information about delta item of file system 40. The delta items of the file system 40 may be identified by comparing the updated file systems with comparison file 70. A first portion 1125 of first column 1110 identifies the delta items of working version 50. A first portion of second column 1120 identifies the delta items of file system 40, as updated by other users. A second segment 1118 of first column 1110 identifies the operation or equivalent compound operations performed on the delta item of working version 50. Likewise, a second segment 1128 of second column 1120 identifies the operation or equivalent compound operation performed on the delta item of the updated file system. The operation(s) listed in second segment 1128 are assumed to have been performed by others who access the shared file system 40.

For each delta item listed in first column 1110 and second column 1120, the user may elect to keep the changes or maintain the item as it is on file system 40. If the delta item listed in first column 110 conflicts with a delta item in second column 1120, the user may decide how to resolve the conflict. For example, an item in file system 40 may be downloaded onto working version 50, and subsequently operated on in working version 50. The same item downloaded may be accessed by another computer and operated in a different manner, When the synchronization request is made, the computer making that requested is presented with a conflict. The user of that computer may be given the ability to resolve the conflict. The user can pick which delta item to keep and use that item when reconciling with file system 40.

F. Hardware Description

Figure 11:
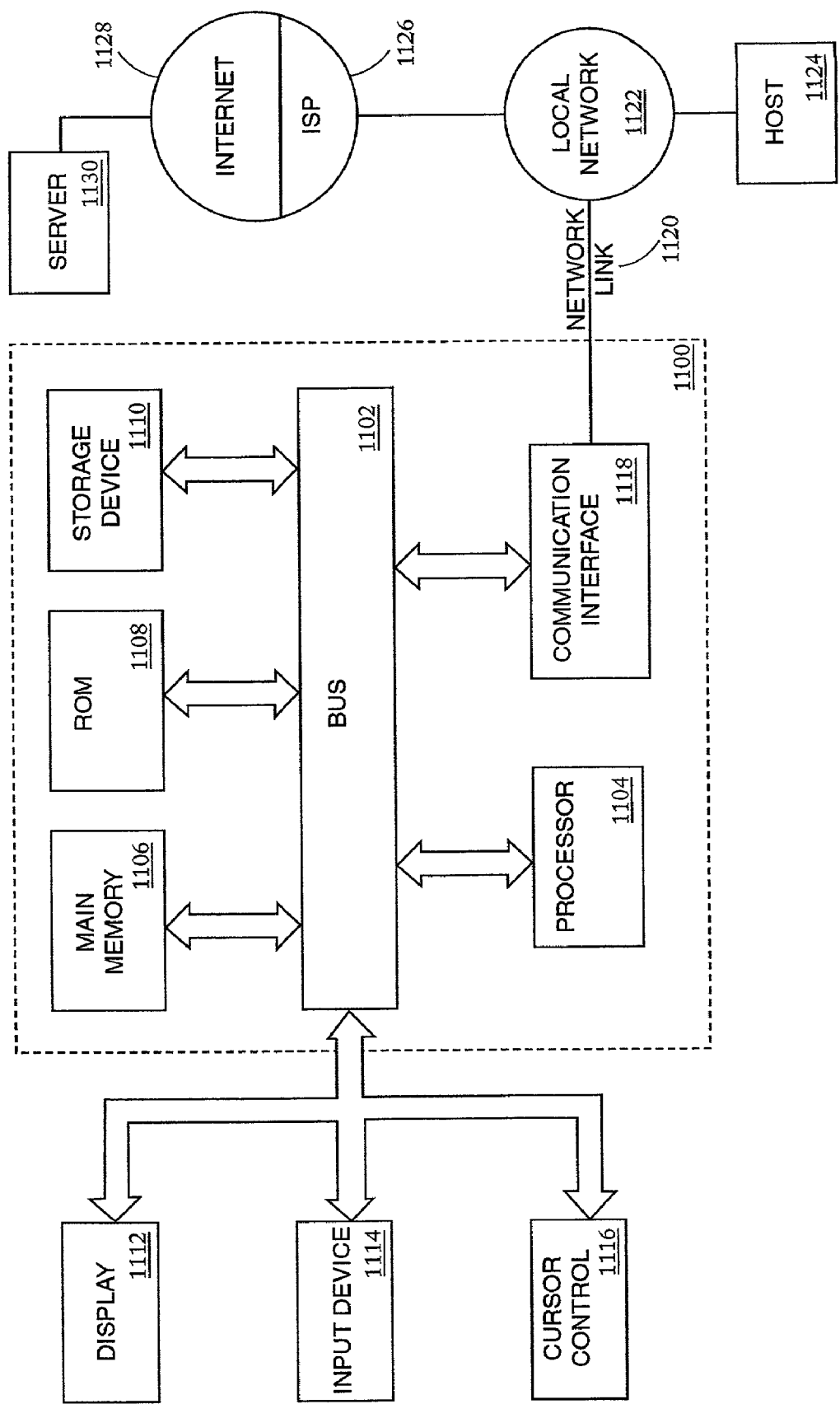
FIG. 11 is a hardware block diagram for use with an embodiment of the invention.

FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution. In this manner, computer system 1100 may obtain application code in the form of a carrier wave.

G. Alternative Embodiments

While embodiments provided herein (see e.g. FIG. 1) describe reconciliation information as being in the form of metadata information, other embodiments may use portions or all of the content for items in first portion 46 (FIG. 1) to identify changes to items of the working version 50 (FIG. 1). In particular, content matching may be used to determine whether one item was copied from another. An intelligent algorithm may be employed to detect similarities between contents of items using the assumption that items with specific types of similarities are copies of one another.

Content matching may also be used as an additive step in a process such as described with FIG. 9. For example, if an equivalent operation is detected as shown by step 970, it may not be possible to determine whether the item was new, edited and also copied. Content matching may be required to detect whether one item is an edited copy of another item that was new.

Another use for content matching is as a tie-breaker, in case one or both time values of an item are exactly the same as another item. Considering the significant digits (i.e. one millionth of a second) of time values applied in popular operating systems such as WIDNOWS, the chances of two items having exactly the same creation time or modification times is remote. However, if there is an exact match between time values of different items, embodiments of the invention allow for content matching to decipher between the two items.

While embodiments of the invention have been described for synchronizing files operated on different computers, it should be noted that other embodiments may be applied to stand alone or singular computer systems. For example, one application for an embodiment of the invention is to synchronize one file containing multiple entries with a backup file that was created as an archive. No interaction with other computer systems may be needed.

In some applications, it may be more useful to not detect certain equivalent compound operations, but rather assume more simple operations were performed on an item. Alternatively, the equivalent compound operations may be detected, but other operations may be used to update the file system 40. For example, an embodiment of the invention may treat the equivalent compound operation of (Nx)Cy as Nx and Ny. Thus, during synchronization, file system 40 will be instructed to add two new items. Similarly, the compound operation of E(xCy) may be treated as Ny, where file system 40 may be instructed to create one new file, rather than copy X to Y, then edit it.

H. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for managing files, the method comprising:
   recording information about one or more items in a file system to a comparison file, wherein the information recorded to the comparison file includes location information to identify where in the file system the one or more items are located;
   generating a working version of a portion of the file system, the working version including at least one or more working items that coffespond to the one or more items located in the file system;
   persistently maintaining the working version; and
   upon a synchronization event, comparing the location information for the one or more items in the comparison file to the working version to determine if any of the corresponding one or more working items has been moved to a new location in the working version;
   wherein the method is performed by one or more computing devices.

2. The computer-implemented method of claim 1, wherein if any of the corresponding working items has been moved in the working version, the method includes causing the item in the file system to move to a corresponding new location in the file system.

3. The computer-implemented method of claim 1, wherein comparing the location information for the one or more items in the comparison file to the working version to determine if any of the corresponding one or more working items has been moved to a new location includes determining if any of the one or more working items has a new name.

4. The computer-implemented method of claim 3, wherein generating the working version of a portion of the file system includes recording a creation time of the one or more working items in the comparison file.

5. The computer-implemented method of claim 4, further including using the creation time of the one or more working items to determine if any of the one or more working items has been deleted from the working version and signaling the file system to delete the corresponding item in the file system.

6. The computer-implemented method of claim 4, wherein making a working version of a portion of the file system includes recording a modification time of the one or more working items in the comparison file.

7. The computer-implemented method of claim 6, further comprising determining if the one or more working items were edited subsequent to making the working version using the modification time of the one or more working items.

8. The computer-implemented method of claim 7, further comprising determining if a subsequent modification time of the one or more working items is different than the recorded modification time for the one or more working items.

9. The computer-implemented method of claim 3, wherein comparing the location information for the one or more items in the comparison file to the working version to determine if any of the corresponding one or more working items has been moved to a new location includes locating the one or more working items in the working version using the creation time.

10. The computer-implemented method of claim 1, further including signaling the file system to delete the item in the file system if the corresponding item has been deleted from the working version.

11. The computer-implemented method of claim 1, further comprising determining if the one or more working items were edited subsequent to making the working version.

12. A computer-implemented method for managing files, the method comprising:
  recording information about one or more items in a file system to a comparison file, wherein the information recorded to the comparison file includes location information to identify where in the file system the one or more items is located;
  making a working version of a portion of the file system, wherein the working version includes one or more working items corresponding to the one or more items in the file system; and
  persistently maintaining the working version; and
  upon a synchronization event, comparing information in the comparison file to the working version to determine if a first working item in the working version was copied from a second working item in the working version;
  wherein the method is performed by one or more computing devices.

13. The computer-implemented method of claim 12, further comprising causing the portion of the file system to include the first working item after determining the first working item was copied from the second working item.

14. The computer-implemented method of claim 13, wherein the second working item is created as new after the working version is made.

15. The computer-implemented method of claim 13, wherein a content of the first working item is different than a content of the second working item.

16. The computer-implemented method of claim 12, wherein the second working item originates from a first item in the portion of the file system.

17. The computer-implemented method of claim 16, wherein making a working version includes recording both a creation time and a modification time in the comparison file for the one or more working items.

18. The computer-implemented method of claim 17, wherein comparing information in the comparison file to the working version to determine if a first working item in the working version was once copied from a second working item in the working version includes identifying a creation time and a modification time for the first working item.

19. The computer-implemented method of claim 18, wherein comparing information in the comparison file to the working version to determine if a first working item in the working version was once copied from a second working item in the working version includes detecting that the modification time of the first working item is before the creation time of the first working item.

20. The computer-implemented method of claim 19, wherein comparing information in the comparison file to the working version to determine if a first working items in the working version was once copied from a second working item in the working version includes matching the modification time of the first working items with the modification time of the second working item.

21. The computer-implemented method of claim 18, further comprising determining that the first working item is new if the creation time of the first working items is different than a creation time of all of the items identified by the comparison file, and if the modification time for the first working item is greater than or equal to creation time for the first working item.

22. The computer-implemented method of claim 21, further comprising causing the portion of the file system to include the first working item after determining the first working item is new.

23. The computer-implemented method of claim 12, further comprising determining if the first working item was edited after being copied from the second working item.

24. The computer-implemented method of claim 12, wherein comparing information in the comparison file to the working version to determine if a first working item in the working version was once copied from a second working item in the working version includes comparing a content of the first working item to a content of the second working item.

25. A computer-implemented method for managing files, the method comprising:
  recording information about a file system to a comparison file, the information identifying at least a first item in the file system located at a first location, the first location being identifiable by a first location information;
  making a working version of a portion of the file system, the working version including at least a first working item originating from the first item, the first working item initially being located at a first working location, the first working location corresponding to the first location information;
  persistently maintaining the working version; and
  upon a synchronization event, comparing information in the comparison file to the working version to detect if at least one of two operations were performed on the working version, the operations including changing the first working location information for the first working item, and editing a content of the first working item;
  wherein the method is performed by one or more computing devices.

26. The computer-implemented method of claim 25, wherein making a working version of a portion of the file system includes recording an initial modification time for the first working item in the comparison file, the initial modification time recording a last instance when the first working item was either edited or created.

27. The computer-implemented method of claim 26, wherein detecting the operation of editing the content of the first working item includes subsequently determining if the initial modification time was changed.

28. The computer-implemented method of claim 27, further comprising causing the first item of the file system to include the edited content of the first working item.

29. The computer-implemented method of claim 25, wherein making a working version of the file system includes recording a creation time for the first working item.

30. The computer-implemented method of claim 29, wherein comparing information in the comparison file to the working version to detect if at least one of two operations were performed on the working version includes locating the first working item in the working version using the creation time.

31. A computer-implemented method for managing files, the method comprising:
   recording information about a file system to a comparison file, the information identifying at least a first item in the file system located at a first location, the first location being identifiable by a first location information;
   making a working version of a portion of the file system, the working version including at least a first working item originating from the first item, the first working item initially being located at a first working location, the first working location corresponding to the first location information;
   persistently maintaining the working version; and
   upon a synchronization event, comparing information in the comparison file to the working version to determine if a compound operation was performed on the first working item, the compound operation including at least two successive operations from a set of operations that consist of changing the first working location information for the first working item, making a first working copy from the first working item, and editing a content of the first working item;
   wherein the method is performed by one or more computing devices.

32. The computer-implemented method of claim 31, further comprising causing the portion of the file system to incorporate changes made by operations performed on the working version so that the first item matches the first working item.

33. The computer-implemented method of claim 31, wherein when one of the at least two successive compound operations is making a first working copy from the first working item, the method further includes determining if a selected working item in the working version was once copied from the first working item.

34. A computer readable storage medium carrying instructions for managing files, the instructions including instructions for performing the steps of:
   recording information about one or more items in a file system to a comparison file, wherein the information recorded to the comparison file includes location information to identify where in the file system the one or more items are located;
   generating a working version of a portion of the file system, the working version including at least one or more working items that coffespond to the one or more items located in the file system;
   persistently maintaining the working version; and
   upon a synchronization event, comparing the location information for the one or more items in the comparison file to the working version to determine if any of the corresponding one or more working items has been moved to a new location in the working version.

35. The computer readable storage medium of claim 34, wherein if any of the corresponding working items has been moved in the working version, the method includes causing the item in the file system to move to a corresponding new location in the file system.

36. The computer readable storage medium of claim 34, wherein the step of comparing the location information for the one or more items in the comparison file to the working version to determine if any of the corresponding one or more working items has been moved to a new location includes instructions for determining if any of the one or more working items has a new name.

37. The computer readable storage medium of claim 36, wherein the step of generating the working version of a portion of the file system includes instructions for recording a creation time of the one or more working items in the comparison file.

38. The computer readable storage medium of claim 37, further including instructions for using the creation time of the one or more working items to determine if any of the one or more working items has been deleted from the working version and signaling the file system to delete the corresponding first in the file system.

39. The computer readable storage medium of claim 37, wherein the step of making a working version of the file system includes instructions for recording a modification time of the one or more working items in the comparison file.

40. The computer readable storage medium of claim 39, further comprising instructions for determining if the one or more working items was edited subsequent to making the working version using the modification time of the one or more working items.

41. The computer readable storage medium of claim 40, wherein the step of using the modification time of the one or more working items includes instructions for determining if a subsequent modification time of the one or more working items is different than the recorded modification time for the one or more working items.

42. The computer readable storage medium of claim 36, wherein the step of comparing the location information for the one or more items in the comparison file to the working version to determine if any of the working items has been moved to a new location includes locating the one or more working items in the working version using the creation time.

43. The computer readable storage medium of claim 34, further including instructions for signaling the file system to delete the item in the file system if the corresponding working item has been deleted from the working version.

44. The computer readable storage medium of claim 34, further comprising instructions for determining if the one or more working items was edited subsequent to making the working version.

45. A computer readable storage medium carrying instructions for managing files on different computers, the instructions including instructions for performing the steps of:
   recording information about one or more items in a file system to a comparison file, wherein the information recorded to the comparison file includes location information to identify where in the file system the one or more items is located;
   making a working version of a portion of the file system, wherein the working version includes one or more working items corresponding to the one or more items in the file system; and
   persistently maintaining the working version; and
   upon a synchronization event, comparing information in the comparison file to the working version to determine if a first working item in the working version was copied from a first working item location in the working version.

46. The computer readable storage medium of claim 45, further comprising instructions for causing the file system to copy a corresponding first file system item to a corresponding new location in the file system after determining the first working item was copied from the first working item location in the working version.

47. The computer readable storage medium of claim 46, wherein a content of the first working item is different than a content of a second working item.

48. The computer readable storage medium of claim 45, wherein the step of making a working version includes instructions for recording both a creation time and a modification time in the comparison file for the first working item after it has been copied to a second working item location.

49. The computer readable storage medium of claim 48, wherein the step of using information in the comparison file and about the working version to determine if a first working item in the working version was once copied from a first working item location to the second working item location in the working version includes instructions for identifying a creation time and a modification time for the first working item.

50. The computer readable storage medium of claim 49, further comprising instructions for performing the steps of determining that the first working item is new if the creation time of the first working item is different than a creation time of all of the items identified by the comparison file, and if the modification time for the first working item at the second working item location is greater than or equal to the creation time for the first working item at the first working item location.

51. The computer readable storage medium of claim 50, further comprising instructions for performing the step of causing the file system to include a corresponding item in the file system after determining the first working item is new.

52. The computer readable storage medium of claim 49, wherein the step of using information in the comparison file and about the working version to subsequently determine if a first working item in the working version was once copied from a first working item location to the second working item location in the working version includes instructions for detecting that the modification time of the first working item at the first working item location is before the creation time of the first working item at the second working item location.

53. The computer readable storage medium of claim 52, wherein the step of using information in the comparison file and about the working version to subsequently determine if a first working item in the working version was once copied from the first working item location to the second working item location in the working version includes instructions for matching the modification time of the first working item at the first working location with the modification time of the first working item at the second working location.

54. The computer readable storage medium of claim 45, further comprising instructions for performing the steps of determining if the first working item was edited after being copied.

55. The computer readable storage medium of claim 45, wherein the step of using information in the comparison file and about the working version to subsequently determine if a first working item in the working version was once copied from a first working item location in the working version includes instructions for comparing a content of the first working item to a content of the working item at the second working item location.

56. A computer readable storage medium for managing files, the computer readable medium carrying instructions including instructions for performing the steps of:
    recording information about a file system to a comparison file, the information identifying at least a first item in the file system located at a first location, the first location being identified by a first location information;
    making a working version of a portion of the file system, the working version including at least a first working item originating from the first item, the first working item initially being located at a first working location, the first working location corresponding to the first location information;
    persistently maintaining the working version; and
    upon a synchronization event, using information in the comparison file and about the working version to detect if at least one of two operations were performed on the working version, the operations including changing the first location information for the first working item, and editing a content of the first working item.

57. The computer readable storage medium of claim 56, wherein the step of making a working version of a portion of the file system includes instructions for recording an initial modification time for the first working item in the comparison file, the initial modification time recording a last instance when the first working item was either edited or created.

58. The computer readable storage medium of claim 57, wherein the step of comparing information in the comparison file to the working version to detect if at least one of two operations were performed on the working version includes instructions for subsequently determining if the initial modification time was changed.

59. The computer readable storage medium of claim 58, further comprising instructions for performing the step of causing the file system to include the edited content of the first working item.

60. The computer readable storage medium of claim 56, wherein the step of making persistently maintaining a working version of a portion of the file system includes instructions for recording a creation time for the first working item.

61. The computer readable storage medium of claim 60, wherein the step of using information in the comparison file and about the working version to detect if at least one of two operations were performed on the working version includes instructions for locating the first working item in the working version using the creation time.

62. A computer readable storage medium carrying instructions for managing files, the instructions including instructions for performing the steps of:
    recording information about a file system to a comparison file, the information identifying at least a first item in the file system located at a first location, the first location being identified by a first location information;
    making a working version of a portion of the file system, the working version including at least a first working item originating from the first item, the first working item initially being located at a first working location, the first working location corresponding to the first location information;
    persistently maintaining the working version; and
    upon a synchronization event, comparing information in the comparison file to the working version to determine if a compound operation was performed on the first working item, the compound operation including at least two successive operations from a set of operations that consist of changing the first working location information for the first working item, making a first working copy from the first working item, and editing a content of the first working item.

63. The computer readable storage medium of claim 62, further comprising instructions for indicating which of the operations were performed on the first working item to change the first item in the file system if the compound operation is determined to have been performed.

64. The computer readable storage medium of claim 62, wherein when one of the at least two successive compound operations is making a first working copy from the first working item, the computer readable medium further includes instructions for determining if a selected working item in the working version was once copied from the first working item.

* * * * *

UNITED STATES PATENT AND TRADEMARK OFFICE
CERTIFICATE OF CORRECTION

| | | |
|---|---|---|
| PATENT NO. | : 7,711,771 B2 | Page 1 of 1 |
| APPLICATION NO. | : 09/866143 | |
| DATED | : May 4, 2010 | |
| INVENTOR(S) | : Ilya Kirnos | |

It is certified that error appears in the above-identified patent and that said Letters Patent is hereby corrected as shown below:

In column 20, line 34, in claim 1, delete "coffespond" and insert -- correspond --, therefor.

In column 23, line 52, in claim 34, delete "coffespond" and insert -- correspond --, therefor.

Signed and Sealed this
Second Day of August, 2011

David J. Kappos
*Director of the United States Patent and Trademark Office*